(12) United States Patent
Kirby et al.

(10) Patent No.: US 12,313,432 B2
(45) Date of Patent: May 27, 2025

(54) ANALOG OPTICAL POSITIONING SENSOR, METHOD, AND CIRCUIT

(71) Applicant: SARCOS CORP., Salt Lake City, UT (US)

(72) Inventors: Richard Kirby, Heber City, UT (US); Fraser Smith, Salt Lake City, UT (US); Marc Olivier, Salt Lake City, UT (US)

(73) Assignee: Sarcos Corp., Salt Lake City, UT (US)

( * ) Notice: Subject to any disclaimer, the term of this patent is extended or adjusted under 35 U.S.C. 154(b) by 0 days.

(21) Appl. No.: 18/340,415

(22) Filed: Jun. 23, 2023

(65) Prior Publication Data

US 2024/0426638 A1  Dec. 26, 2024

(51) Int. Cl.
*G01D 5/34* (2006.01)
*G01B 11/26* (2006.01)
*G01B 11/02* (2006.01)
*G01B 11/14* (2006.01)

(52) U.S. Cl.
CPC .............. *G01D 5/34* (2013.01); *G01B 11/26* (2013.01); *G01B 11/02* (2013.01); *G01B 11/14* (2013.01)

(58) Field of Classification Search
None
See application file for complete search history.

(56) References Cited

U.S. PATENT DOCUMENTS

| | | |
|---|---|---|
| 4,275,599 A | 6/1981 | Kohlenberger et al. |
| 4,514,858 A | 4/1985 | Novak |
| 4,611,292 A | 9/1986 | Ninomiya et al. |
| 4,714,339 A | 12/1987 | Lau et al. |
| 4,753,569 A | 6/1988 | Pryor |
| 4,843,372 A | 6/1989 | Savino |
| 4,853,771 A | 8/1989 | Witriol et al. |
| 4,891,526 A | 1/1990 | Reeds |
| 4,935,616 A | 6/1990 | Scott |

(Continued)

FOREIGN PATENT DOCUMENTS

| | | |
|---|---|---|
| CN | 115183920 A | 10/2022 |
| EP | 0725393 A1 | 8/1996 |

(Continued)

OTHER PUBLICATIONS

Gao et al., Displacement sensing and estimation theory and applications, Applied Physics A, Mar. 11, 2005, pp. 1265-1278, Springer-Verlag, Germany.

(Continued)

*Primary Examiner* — Jennifer D Bennett
*Assistant Examiner* — Erin R Garber
(74) *Attorney, Agent, or Firm* — Christopher L. Johnson

(57) ABSTRACT

A sensor, method and integrated circuit for optically sensing the relative displacement of an object. The sensor may generate optical patterns of light and employ a multielement photodetector to detect the light and output corresponding analog signals proportional to the light detected. The sensor may achieve a sample rate that is orders of magnitude greater than conventional systems. The sensor may also achieve image resolution that is orders of magnitude greater than conventional systems. The sensor is useful for applications including the measurement of linear displacement and rotation, force, torque, or strain with respect to multiple degrees of freedom.

20 Claims, 16 Drawing Sheets

(56) References Cited

U.S. PATENT DOCUMENTS

| | | | |
|---|---|---|---|
| 5,059,013 A | 10/1991 | Jain | |
| 5,148,018 A | 9/1992 | Ammann | |
| 5,404,132 A | 4/1995 | Canty et al. | |
| 5,430,643 A | 7/1995 | Seraji | |
| 5,532,473 A | 7/1996 | Chin | |
| 5,539,519 A | 7/1996 | Takagi et al. | |
| 5,579,444 A | 11/1996 | Dalziel et al. | |
| 5,610,719 A | 3/1997 | Allen et al. | |
| 5,684,596 A | 11/1997 | Eslinger et al. | |
| 5,699,444 A | 12/1997 | Palm | |
| 6,141,104 A | 10/2000 | Schulz et al. | |
| 6,775,013 B2 | 8/2004 | Wang | |
| 8,095,237 B2 | 1/2012 | Habibi et al. | |
| 8,102,426 B2 | 1/2012 | Yahav et al. | |
| 8,848,170 B2 | 9/2014 | Hakim et al. | |
| 8,902,411 B2 | 12/2014 | Park et al. | |
| 9,245,916 B2 | 1/2016 | Smith | |
| 9,651,365 B2 | 5/2017 | Smith | |
| 9,848,122 B2 | 12/2017 | Smith | |
| 9,851,196 B2 | 12/2017 | Smith | |
| 9,874,433 B2 | 1/2018 | Smith | |
| 10,077,978 B2 | 9/2018 | Smith | |
| 10,197,383 B2 | 2/2019 | Smith | |
| 10,215,555 B2 | 2/2019 | Chen et al. | |
| 10,228,234 B2 | 3/2019 | Smith | |
| 10,451,404 B2 | 10/2019 | Smith | |
| 10,677,583 B2 | 6/2020 | Smith | |
| 10,690,479 B2 | 6/2020 | Smith | |
| 11,635,486 B2 | 4/2023 | Schildknecht et al. | |
| 2003/0080282 A1 | 5/2003 | Walley | |
| 2003/0093805 A1 | 5/2003 | Gin | |
| 2003/0174865 A1 | 9/2003 | Vernon | |
| 2003/0178556 A1 | 9/2003 | Tachi et al. | |
| 2004/0027586 A1 | 2/2004 | Ichikawa et al. | |
| 2004/0246473 A1 | 12/2004 | Hermary et al. | |
| 2005/0190451 A1 | 9/2005 | Hansen | |
| 2005/0219554 A1 | 10/2005 | Tobiason et al. | |
| 2005/0259267 A1 | 11/2005 | Carlisle et al. | |
| 2006/0098098 A1 | 5/2006 | Seo | |
| 2007/0051884 A1 | 3/2007 | Romanov et al. | |
| 2007/0062284 A1 | 3/2007 | Machida | |
| 2008/0018911 A1* | 1/2008 | Igaki | H01L 25/167 250/206.1 |
| 2008/0037881 A1 | 2/2008 | Murashita et al. | |
| 2008/0106747 A1 | 5/2008 | Kudo et al. | |
| 2009/0225305 A1 | 9/2009 | Hwang et al. | |
| 2010/0047001 A1 | 2/2010 | Montierth et al. | |
| 2011/0043446 A1 | 2/2011 | Spears et al. | |
| 2011/0154907 A1 | 6/2011 | Schmidt et al. | |
| 2011/0168874 A1 | 7/2011 | Phan Le | |
| 2012/0044477 A1 | 2/2012 | Han | |
| 2012/0081543 A1 | 4/2012 | Tobiason | |
| 2012/0176629 A1 | 7/2012 | Allen et al. | |
| 2012/0206390 A1 | 8/2012 | Ueno et al. | |
| 2013/0070074 A1 | 3/2013 | Won | |
| 2014/0140623 A1 | 5/2014 | Hamming et al. | |
| 2015/0014514 A1 | 1/2015 | Smith | |
| 2015/0347801 A1 | 12/2015 | Svetal | |
| 2016/0076936 A1 | 3/2016 | Schoch et al. | |
| 2016/0146600 A1 | 5/2016 | Taghavi Larigani | |
| 2016/0305763 A1* | 10/2016 | Smith | G01B 11/002 |
| 2016/0309083 A1 | 10/2016 | Smith | |
| 2017/0069076 A1* | 3/2017 | Yoshimuta | H04N 23/663 |
| 2017/0146338 A1 | 5/2017 | Allen | |
| 2017/0191891 A1 | 7/2017 | Jentoft et al. | |
| 2017/0363464 A1 | 12/2017 | Shafer et al. | |
| 2019/0170501 A1 | 6/2019 | Smith | |
| 2020/0011712 A1* | 1/2020 | McKendrick | G01D 5/34 |
| 2020/0209729 A1 | 7/2020 | Chen et al. | |
| 2021/0402210 A1* | 12/2021 | Petluri | H05B 47/105 |
| 2023/0213610 A1* | 7/2023 | Eberspach | G01J 1/4228 |
| 2023/0251081 A1 | 8/2023 | Kirby et al. | |

FOREIGN PATENT DOCUMENTS

| | | |
|---|---|---|
| EP | 1870170 A2 | 12/2007 |
| JP | H04-350513 A | 12/1992 |
| JP | 06-267819 A | 9/1994 |
| JP | 11-166809 A | 6/1999 |
| JP | 3433235 B2 | 8/2003 |
| JP | 2011-257267 A | 12/2011 |
| KR | 2006-0049334 A | 5/2006 |
| KR | 2013-0020408 A | 2/2013 |
| WO | WO 94/01788 | 1/1994 |
| WO | WO 2024/099660 A1 | 5/2024 |

OTHER PUBLICATIONS

Wikipedia, Absolute scale, https://web.archive.org/web/20220127050212/https://en.wikipedia.org/wiki/Absolute_scale, Jan. 27, 2022, 1 page, retrieved from https://web.archive.org/web/20220127050212/https://en.wikipedia.org/wiki/Absolute_scale.

Wikipedia, Fiducial marker, https://web.archive.org/web/20220201050847/https://en.wikipedia.org/wiki/Fiducial_marker, Feb. 1, 2022, 3 pages, retrieved from https://web.archive.org/web/20220201050847/https://en.wikipedia.org/wiki/Fiducial_marker.

Wikipedia, Image formation, https://web.archive.org/web/20190620175949/https://en.wikipedia.org/wiki/Image_formation, Jun. 20, 2019, 2 pages, retrieved from https://web.archive.org/web/20190620175949/https://en.wikipedia.org/wiki/Image_formation.

Wikipedia, Image gradient, https://web.archive.org/web/20220206102446/https://en.wikipedia.org/wiki/Image_gradient, Feb. 6, 2022, 2 pages, retrieved from https://web.archive.org/web/20220206102446/https://en.wikipedia.org/wiki/Image_gradient.

Wikipedia, Interferometry, https://web.archive.org/web/20220126213631/https://en.wikipedia.org/wiki/Interferometry, Jan. 26, 2022, 16 pages, retrieved from https://web.archive.org/web/20220126213631/https://en.wikipedia.org/wiki/Interferometry.

Wikipedia, LIGO, https://web.archive.org/web/20220206180020/https://en.wikipedia.org/wiki/LIGO, Feb. 6, 2022, 12 pages, retrieved from https://web.archive.org/web/20220206180020/https://en.wikipedia.org/wiki/LIGO.

Wikipedia, Optical aberration, aberration, https://web.archive.org/web/20220114232905/https://en.wikipedia.org/wiki/Optical_aberration, Jan. 14, 2022, 10 pages, retrieved from https://web.archive.org/web/20220114232905/https://en.wikipedia.org/wiki/Optical_aberration.

Wikipedia, Paraxial approximation, https://web.archive.org/web/20210818191932/https://en.wikipedia.org/wiki/Paraxial_approximation, Aug. 18, 2021, 1 page, retrieved from https://web.archive.org/web/20210818191932/https://en.wikipedia.org/wiki/Paraxial_approximation.

Woody et al.; An Imaging Displacement Sensor with Nanometer Accuracy; Modern Technologies in Space- and Ground-based Telescopes and Instrumentation II; Sep. 13, 2012; 12 pages; Proceedings of SPIE vol. 8450; SPIE.

Woody et al.; An Imaging displacement sensor with nanometer precision and high stability; Research paper; May 16, 2011; 12 pages; John B. and Nelly Kilroy Foundation.

International Search Report for International Application No. PCT/US2024/035159 dated Oct. 21, 2024, 14 pages.

\* cited by examiner

211

213

215

217

219

221

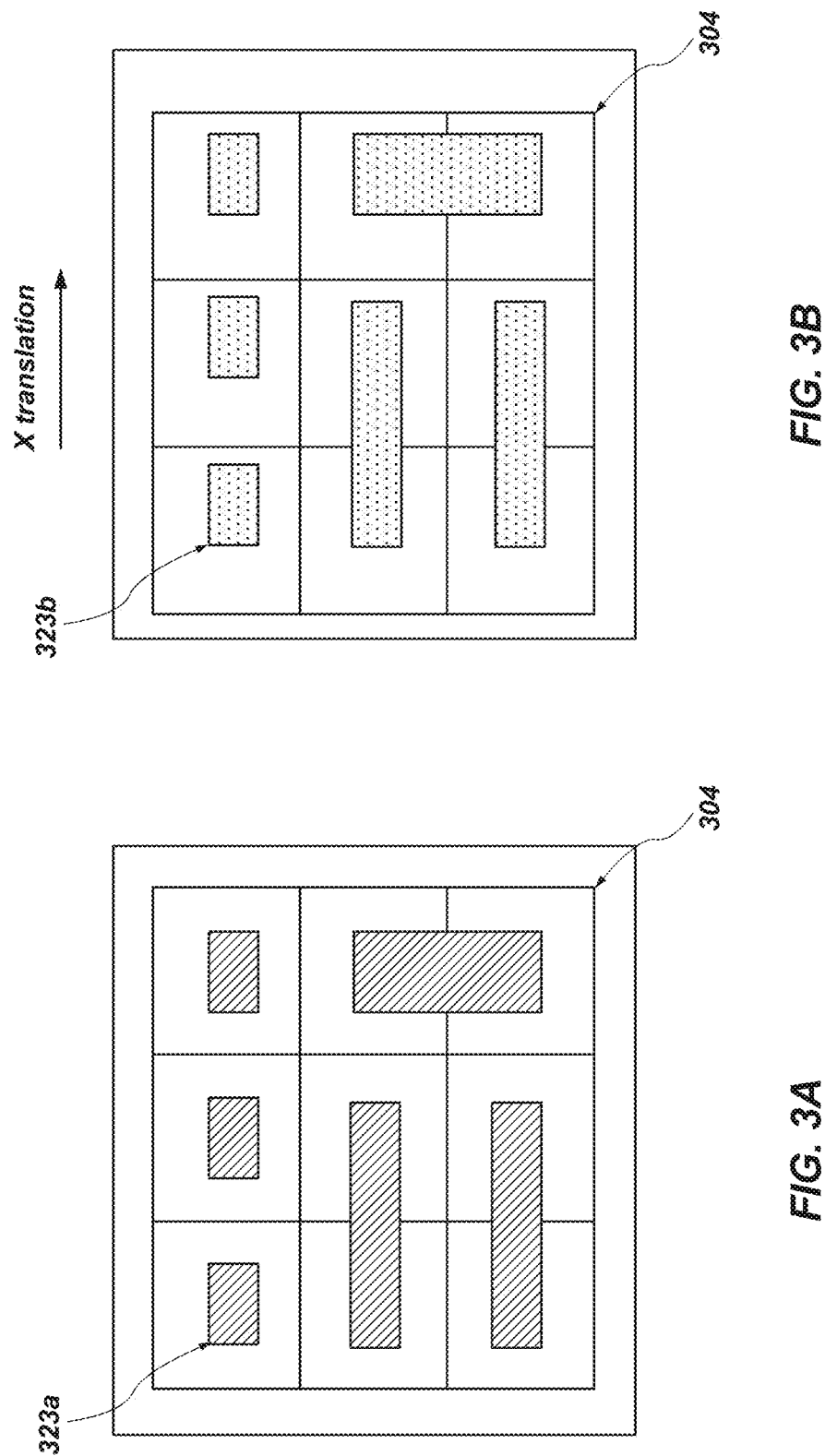

ANALOG OPTICAL POSITIONING SENSOR, METHOD, AND CIRCUIT

GOVERNMENT LICENSE RIGHTS

This invention was made with Government support under Contract No. FA8650-19-C-9219 awarded by AFRL Wright Research Site. The Government has certain rights in the invention.

FIELD OF INVENTION

Displacement sensors can support a wide variety of applications in which measurement of the size, length, or amount of something can be calculated based at least in part on a displacement measurement. Displacement sensors find practical applications being used to measure linear displacement and rotation angle, rate of linear displacement and rotation, force including multi-axes forces, torque, moments, strain, load, acceleration in one or more directions, inertia, and pressure, among many other practical applications.

BACKGROUND

There are two prior existing technologies that the present invention draws from and improves upon. The first is based on using a high pixel count image sensor—a digital camera integrated circuit (camera chip). The second uses a multielement photodetector, such as a quadrant photodetector, but that may have fewer or more photosensitive elements than the four photosensitive elements in the quadrant photodetector.

In the camera chip-based displacement sensor, a camera chip is used to detect displacement by comparing successive images of a pattern where the pattern changes position on the image sensor proportionally to the relative displacement between the pattern generator and the camera chip.

The key characteristics of camera chip-based displacement measurement include: 1) the image sensor has a large number of pixels, typically over one million. 2) The photosensitive areas (pixels) are small, typically having an area of a few square microns. 3) Due to the small size of the pixels, the useable signal-to-noise ratio (SNR) of the sensor is relatively low on a per-pixel basis. In sensing applications, this low per-pixel SNR is partially compensated for by a large number of pixels. 4) The pixels temporarily store a charge proportional to the illumination level, and that charge is read electronically from each row or all rows simultaneously by sample and hold electronics and 8 to 16-bit analog-to-digital converters (ADCs). 5) Due to the small size of the pixels, the temporary storage capacity of charge due to incident illumination (the "well capacity") is lower than the number of bits in a 16-bit ADC limiting the resolution at which the camera chip can measure changes in illumination. 6) Computation of displacement between images is done on the acquired images on a computer using an image registration algorithm. 7) Due to limitations in the speed of the sampling electronics and the large number of samples (pixels) that need to be processed, the sample rates are typically in the low 100s of Hz range. 8) Due to the high computational complexity of the conversion process between images and displacement, the actual displacement output is currently limited to about 15 Hz, and that requires a high-end, high-power (100s of watts), large (100s of cubic centimeters) and expensive (100s of dollars) Graphics Processing Unit (GPU).

The camera chip-based displacement sensor is described in the following granted patents: U.S. Pat. Nos. 9,848,122, 9,245,916, 9,651,365, 9,851,196, 9,874,433, 10,077,978, 10,197,383, 10,228,234, and 10,451,404 which are hereby incorporated by reference in their entirety. Further implementations of the technology are described in U.S. application Ser. No. 17/669,199, which is hereby incorporated in its entirety.

The second technology uses multielement photodetectors that continually output an electrical current relative to the illumination intensity. The most common device of this kind is the quadrant photodetector that is utilized to center laser beams. However, the concept of multielement photodetectors applies to any arbitrary number of elements (e.g., 2 elements—a 1×2, 9 elements—a 3×3, 12 elements—a 3×4, 16 elements—a 4×4).

Typically, these multielement photodetectors are used to measure the displacement of an illumination spot and generate an analog control signal proportional to that displacement. In many instances, this signal is then used in a feedback control system to re-center the spot.

The key characteristics of a multielement photodetector are: 1) The photodetector has a small number of light-sensitive elements (pixels). 2) The light-sensitive elements are large, typically with square millimeters of surface area. 3) Due to the large size of the light-sensitive elements, the SNR is high (1000 to 1,000,000 times greater than the camera-type image sensor, discussed in (1) above, is not uncommon). 4) Due to the large light-sensitive elements, the output is multiple orders of magnitude more electrons than with a camera-type image sensor, more than the bits in a 32-bit ADC, allowing for six orders-of-magnitude higher resolution of the light intensity measurement than a camera-type image sensor. 5) Due to the small number of light-sensitive elements, the output of the photodetector is not a usable image for image registration techniques because of the low spatial discretization of the object being imaged. 6) The output electrical current from each photosensitive element is converted to a voltage and then summed or differenced in analog electronics, and the resulting voltage is proportional to the displacement between the light source and the photodetector. 7) Historically, photodetectors are used to center Gaussian field and intensity profile coherent light beams—referred to as Gaussian beams, for example, a laser, which is inherently noisy. With a Gaussian beam, the output voltages exhibit a highly non-linear dependence on the position of the light beam making for relatively low accuracy of displacement measurements. The mode shifting and interference patterns common in lasers contribute to the noise and reduction in measurement accuracy. 8) Because the outputs are analog voltages, the only limitation to the output sample rate is the speed of the ADC. 1 MHz ADCs are readily available today. 9) multielement photodetectors used with Gaussian beams have a limited dynamic range (half the diameter of the light spot). 10) The displacement resolution of a quadrant photodetector is highest when a Gaussian spot is in the center and drops off precipitously as the spot moves away from the center. 11) Quadrant photodetectors are limited to measuring 2 degrees of freedom (DOFs) when measuring Gaussian spots.

SUMMARY

The present inventions overcome one or more of the identified shortcomings of the conventional camera chip-based displacement sensors and multielement photodetectors.

For example, embodiments of the present invention provide a sensor where the image sample rate is not constrained by the sensor electronics but by the sample rate of an ADC. This is achieved by directly processing the analog voltages that are proportional to the displacement in analog electronics instead of digitally capturing images and processing those digital images on a computer. As a result, embodiments of the present invention can increase the sample rate of the sensor from 100s of Hz to megahertz (MHz). For instance, embodiments of the present invention may increase the rate of conversion of pairs of images from about 15 Hz to 1 MHz.

Embodiments of the present invention leverage the optical concept of spot size. Spot size is the blur diameter of a focused point. In digital photography, the spot size just needs to be smaller than a pixel to get the sharpest quality image. With a multielement photodetector, such as a quadrant photodetector, a collimated, unfocused beam of light has a spot size that is smaller than one of the quadrants, so there is no need to focus the spot to obtain optimal spot centering. Since the Embodiments of the present invention utilize a focused specific pattern, the embodiments are able to obtain substantially larger left-right and top-bottom deltas. Further embodiments are able to obtain a much better resolution, not just in the center but across the entire field of the photodetector (see, for example, FIG. 4). Accordingly, in many instances, embodiments of the present invention are able to obtain two orders of magnitude higher resolution than conventional multielement photodetectors or conventional camera chip-based systems.

In addition, embodiments of the present invention may decrease the computational complexity of the displacement algorithm and, as a result, decrease the associated computing power required. For example, since the computations are done on analog voltages before being converted to digital signals, embodiments of the present invention may not require a central processing unit (CPU) to perform the computations reducing power consumption from 1000s of watts to milliwatts.

Embodiments of the present invention may enable the computational hardware to be orders of magnitude smaller, for instance, a few cubic centimeters vs. 100s of cubic centimeters.

Additionally, embodiments of the present invention may obtain nanometer displacement resolution as compared to micron displacement resolution found in conventional systems. In addition, in some embodiments, voltage output may be linear with displacement. Further, embodiments of the present invention can obtain increased dynamic range because the dynamic range of the sensor is limited only by the size of the detector array and light emitter. Further, embodiments of the present invention may provide a resolution that is constant across a range of displacements. Additionally, embodiments of the present invention may enable the sensor to measure up to six Degrees of Freedom (DOF) of displacement.

BRIEF DESCRIPTION OF THE DRAWINGS

Features and advantages of the apparatus and method disclosed and taught herein will be apparent from the detailed description which follows, taken in conjunction with the accompanying drawings, which together illustrate, by way of example, features of the disclosed embodiments; and, wherein:

FIG. 3A illustrates an example of a light pattern incident on a multielement photodetector;

FIG. 3B illustrates an example of a light pattern incident on a multielement photodetector after a horizontal displacement;

DETAILED DESCRIPTION OF THE PREFERRED EMBODIMENT(S)

Figure 1A:
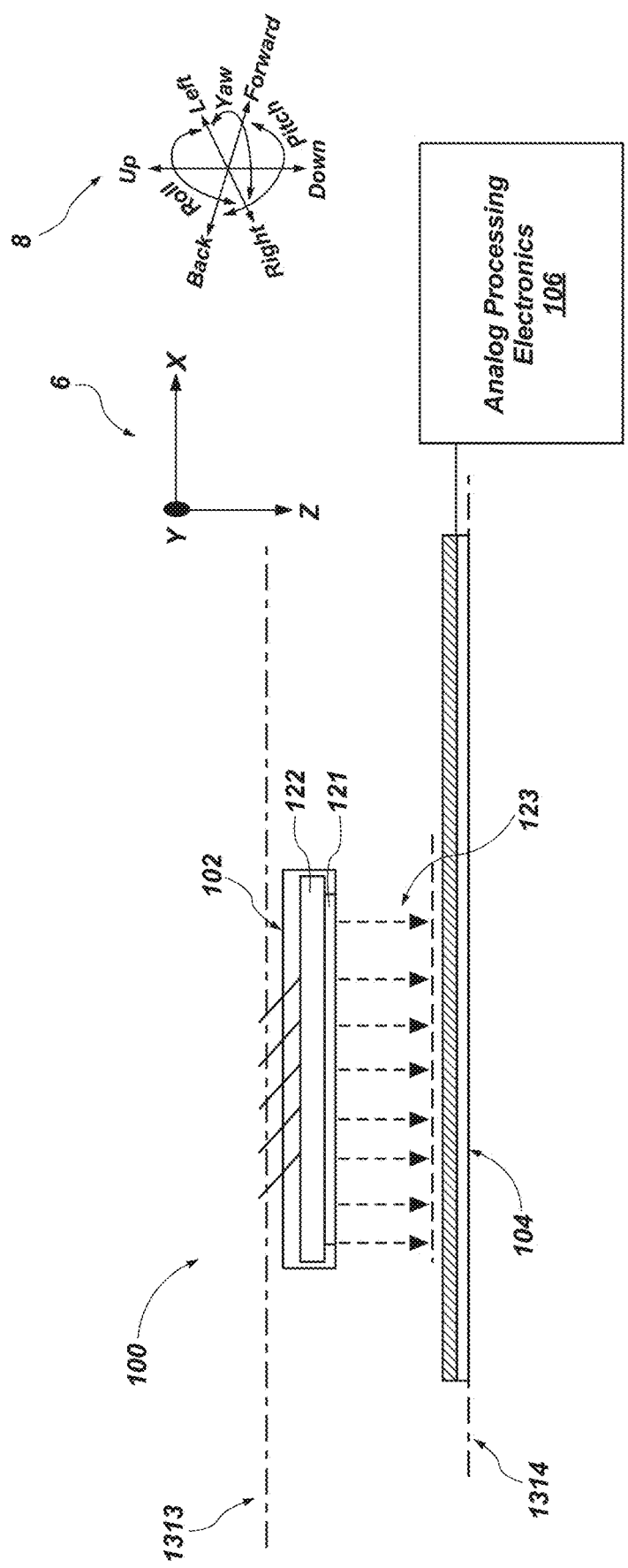
FIG. 1A is a schematic view of a sensor in accordance with an embodiment of the present disclosure.
Figure 1B:
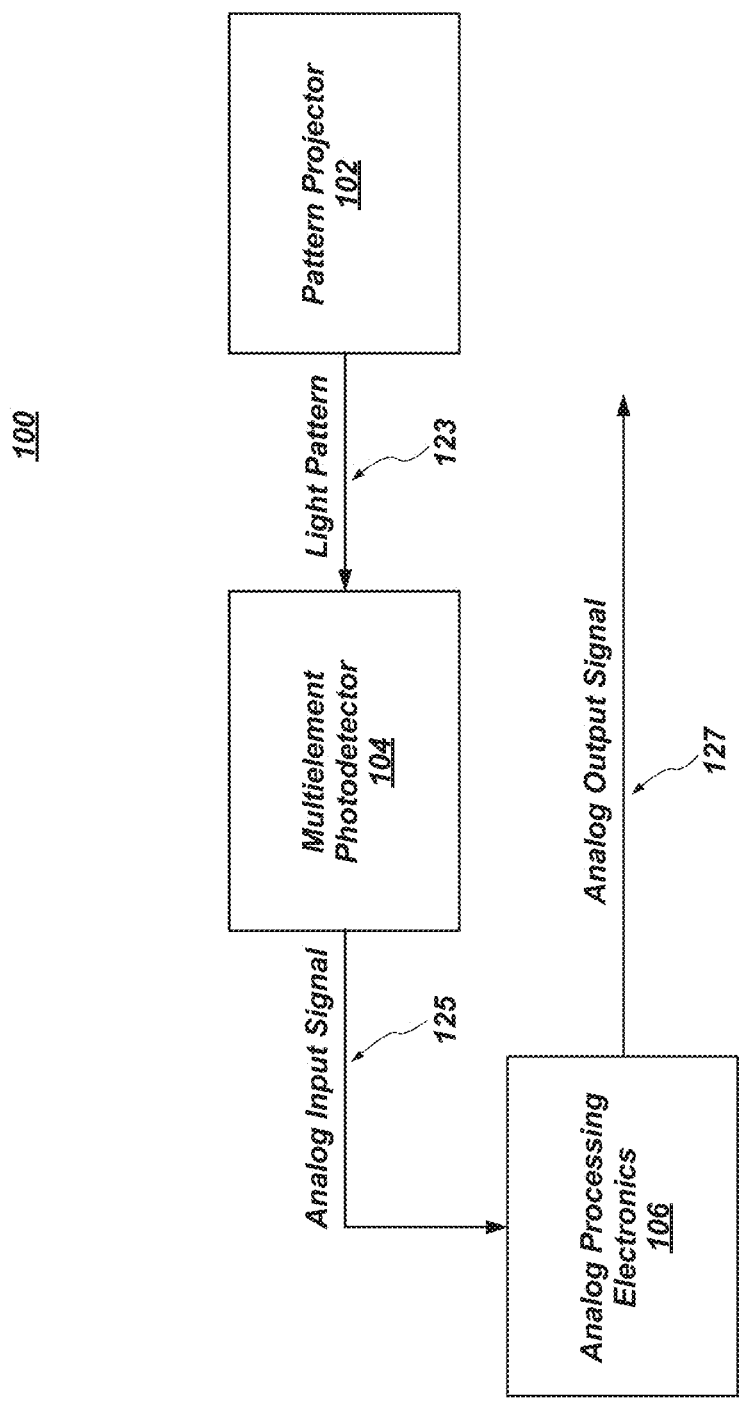
FIG. 1B is a schematic view of a sensor in accordance with an embodiment of the present disclosure.

FIG. 1A ad FIG. 1B illustrate an example displacement sensor 100 embodying the teachings herein. As shown in FIG. 1A, sensor 100 comprises a pattern projector 102, and a multielement photodetector 104.

Pattern projector 102 serves as a 'proxy' target object, i.e., an object whose change in position and/or orientation is being determined by multielement photodetector 104 to determine a displacement of another object or structure to which pattern projector 102 is rigidly affixed. Thus, pattern projector 102 is an integral component of sensor 100. Pattern projector 102 comprises pattern projector 102 and a pattern forming substrate 121 configured as a multi-dimensional array of light intensity pattern portions that define the light intensity pattern of pattern projector 102.

Pattern projector 102 emits the pattern light 123, which generally propagates along a longitudinal axis that is generally perpendicular to a pattern forming substrate 121 in a relative spatial orientation of pattern forming substrate 121 and multielement photodetector 104. Each respective light intensity pattern portion propagates the pattern light 123, in which the light intensity varies accordingly. In a cross-section, the light intensity varies according to the intensity pattern conferred by pattern-forming substrate 121.

In some embodiments, incorporated into the pattern projector, between the pattern projector and the multielement photodetector, or incorporated into the multielement photodetector is an image formation system.

There are a number of different optical component combinations that can be used in an image formation system. These are well described in patent application Ser. No. 17/669,199 which is incorporated in its entirety in this application. The most common is one or a series of coaxially aligned lenses and an aperture. An example of this is a camera lens. Reflecting telescopes, however, form the image with a combination of one or more curved mirrors and one or more coaxially aligned lenses. There may also be an aperture in the system. A lenslet array, which is a series of lenses that are not coaxially aligned, but form an array of parallel axes, may also be used. An array of apertures may also be included in a lenslet array. Image formation systems that are best adapted to each embodiment are well known in the art.

In use, pattern projector 102 can be rigidly affixed to a first structure 1313 and multielement photodetector 104 can be rigidly affixed to a second structure 1314. In some embodiments first structure 1313 and second structure 1314 are separate structures, each of which has up to six degrees of freedom of motion (indicated at 8). In other embodiments first structure 1313 and second structure 1314 can be different structural portions of the same structure, which allows the measurement of the change in shape of the structure due to changes in load. Sensor 100 measures the relative displacement of the first structure 1313 with respect to the second structure 1314 by measuring the relative displacement of pattern projector 102 with respect to multielement photodetector 104.

In some embodiments, sensor 100 includes a flexible support structure that facilitates relative movement between pattern projector 102 and multielement photodetector 104 in at least one degree of freedom so as to allow relative movement therebetween.

In some embodiments, a substrate or mask is disposed on the support structure such that the support structure serves as pattern forming substrate 121 of pattern projector 102. In one example, pattern forming substrate is coated with a material that fluoresces, or pattern forming substrate is made from a material that fluoresces, such that subjecting pattern forming substrate to light from a light source causes pattern forming substrate to excite and fluoresce (emitting light), wherein light emitted from the pattern forming substrate comprises the light intensity pattern for pattern projector 102.

In some embodiments, a pattern projector 102 may include a mask that comprises opaque and transparent areas, i.e., light transmitting areas. In some embodiments, the mask may be fabricated using lithographic processes such as those employed in the semiconductor fabrication industry. Light from a light source may pass through the transparent areas while being blocked by the opaque areas, forming a light intensity pattern. In some instances, the pattern projector 102 may include optics to magnify the pattern light 123 to increase the displacement resolution of the sensor 100.

In some embodiments, a light intensity pattern may be formed using one or more light emitting diode (LED) arrays. In some embodiments, the LED arrays may include organic LEDs (OLEDs). In some embodiments, a light intensity pattern may be formed using one or more quantum dot arrays. In some embodiments, a combination of LED arrays and quantum dot arrays may be used. In another embodiment, the light intensity pattern may be formed by an array of light valves. The array of light valves may act as controllable shutters to selectively allow light to transmit through or block the light. These valves can also allow some intermediate percentage of light through between entirely blocking light, in other words, 0% transmissibility, and allowing all light, in other words, 100% transmissibility. In one example, the light intensity pattern may be formed by a liquid crystal display (LCD). The LCD may use a back light and a layer of valves to control the light that is emitted per valve and, thus, the light intensity pattern.

In some instances, the light intensity pattern generated by the pattern projector 102 may be dynamically configurable. For example, the pattern light 123 can be automatically selected by the pattern projector 102. For example, a machine learning (ML) algorithm such as a Generative Adversarial Network (GAN) may be used to select a pattern light 123 that generates the highest current/voltage outputs per displacement unit along the desired axis or axes of displacement. In other instances, the pattern projector 102 selects the pattern light 123 to obtain local advantages, thereby forming an adaptive sensor. For example, the pattern projector 102 may select a pattern light 123 that is optimized for faster measurements at the expense of the measurement resolution. In other instances, the pattern projector 102 may select a pattern light 123 that is optimized for smaller displacements. In some instances, an optimal pattern for the pattern light 123 for the desired measurement criteria may be selected using a machine learning algorithm.

In some embodiments, the pattern projector 102 may generate two or more pattern lights 123. The pattern light 123 may be incident on the multielement photodetector 104 providing a differential signal that can improve resolution and/or add dimensions. For example, the pattern projector 102 may generate a pattern light 123 that is square and projected onto the multielement photodetector 104 with the addition of a polarizer that is fixed to the multielement photodetector 104 and a second polarizer fixed to the pattern projector 102. As the pattern rotates relative to the multielement photodetector 104, the total illumination varies due to rotation, while the shift of the pattern between quadrants of the photodetector allows the measurement of translation in X and Y.

The analog electronics 106 receives analog input signals 125 from multielement photodetector 104 (see FIG. 1B). The analog input signal 125 is proportional to the illumination on each photosensitive element that comprises the multielement photodetector 104. In response to receiving the analog input signal 125, the analog electronics 106 generates one or more analog output signals 127. The one or more analog output signals 127 are proportional to the displacement between the pattern projector 102 and the multielement photodetector 104 in one or more degrees of freedom 8. In some embodiments, the analog electronics 106 include analog circuit elements such as transimpedance amplifiers and operational amplifiers that perform mathematical operations on the analog input signal 125. In some instances, the analog electronics 106 may be implemented as an application-specific integrated circuit (ASIC) or with a field-programmable gate array (FPGA).

For example, in some instances, the analog electronics 106 perform mathematical operations on the analog input signal 125 received from each photosensitive element in the multielement photodetector 104 such that the resulting voltage and/or current is proportional to the displacement between the pattern projector 102 and the multielement photodetector 104.

In some embodiments, the analog output signals 127 may be subsequently converted to a digital value by an analog to digital converter (ADC) to be used in digital computations. In other embodiments, the analog output signals 127 may be used directly in a position, force, or torque control system as the feedback path into the error computation block of a control system.

In other embodiments, analog and/or digital electronics can be added to directly measure the drive signal (voltage/current) applied to the pattern projector 102. The analog electronics 106 may use this information to normalize the signal from each photosensitive element array in mathematical operations. As a result, in these embodiments, the analog output signals 127 are compensated for fluctuations/noise introduced by light source variations as well as variations in the response of individual photosensitive elements of the multielement photodetector 104.

The multielement photodetector 104 may be formed of two or more (e.g., 1×2, 1×3, 2×2, 2×3, 3×3, 3×4, 4×4) photosensitive elements, each element continually outputting an electrical current proportional to the illuminance impinging on that photosensitive element. The number of elements may be selected based on the number of degrees of freedom (DOF) to be measured.

Figure 2A:
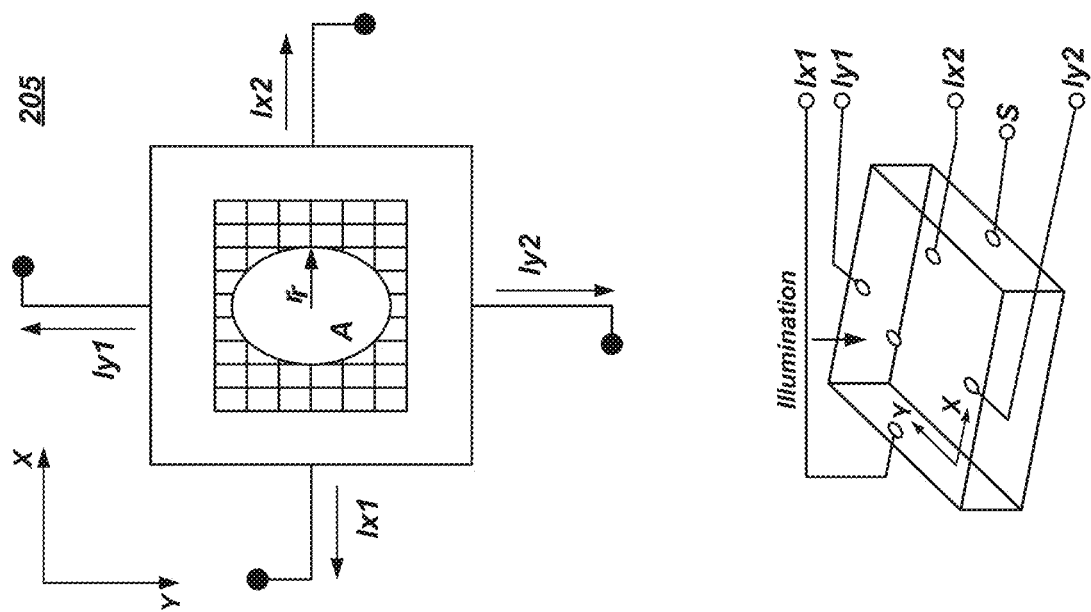
FIG. 2A illustrates an example of a quadrant photodetector that may form the multielement photodetector of a sensor in accordance with an embodiment of the present disclosure.

FIG. 2A illustrates an example of a quadrant photodetector that may form the multielement photodetector 104 that may be incorporated into embodiments of sensor 100.

For example, a commercially available quadrant photodetector 201 may be used. The quadrant photodetector 201 is divided into four quadrants (Q1, Q2, Q3, and Q4), as shown in schematic 203. Each respective quadrant contains a photosensitive element that generates an analog signal that is proportional to the amount of light incident on the respective quadrant. For example, as illustrated in schematic 205, the quadrant photodetector 201 generates an output current (Ix1, Iy1, Ix2, Iy2) that respectively corresponds to the output of the photosensitive element in each respective quadrant. The output current (Ix1, Iy1, Ix2, Iy2) may form the analog input signal 125. Although the example illustrates the analog signal as a current, in other instances, the analog output signal 127 may be a voltage. FIG. 204 illustrates an example electrical schematic of how the quadrant photodetector 201 may be implemented.

Figure 2B:
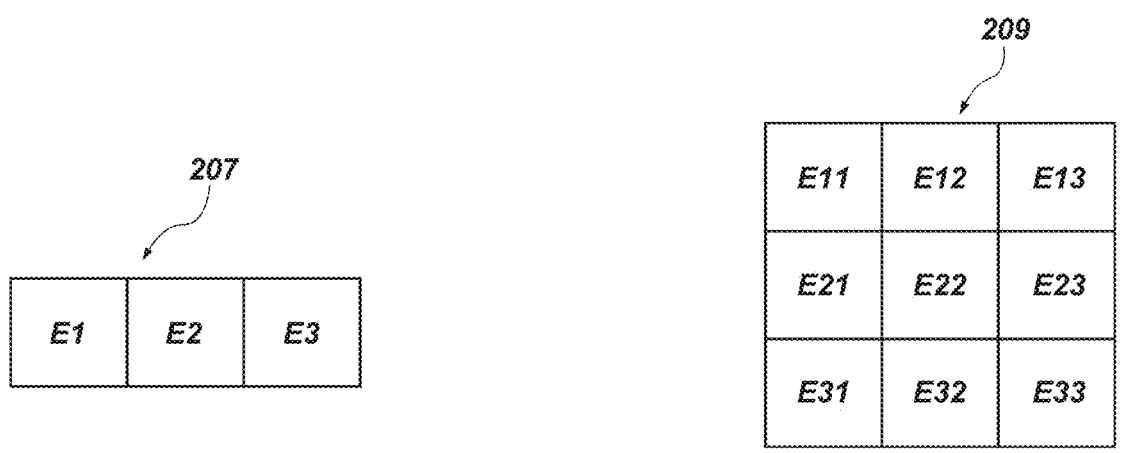
FIG. 2B illustrates additional examples of a multielement photodetector that may be incorporated into embodiments of a sensor in accordance with an embodiment of the present disclosure.

FIG. 2B illustrates additional examples of photodetectors that may be used to form the multielement photodetector 104 that may be incorporated into embodiments of sensor 100. For example, a three-element photodetector 207 may be utilized to form the multielement photodetector 104. Like in the case of the quadrant photodetector, each photosensitive element (E1, E2, and E3) generates an analog signal that is proportional to the amount of light incident on the respective photodetector.

The multielement photodetector 104 may be formed from a nine-element photodetector 209. Like in the case of the quadrant photodetector, each photosensitive element (E11, E21, E31, E21, E22, E32, E31, E32, and E33) generates an analog signal that is proportional to the amount of light incident on the respective photodetector. Although FIG. 2A and FIG. 2B illustrate examples of multielement photodetector 104 with three, four, or nine elements, the multielement photodetector 104 may be formed from a photodetector with any number of elements.

Increasing the number of photodetectors in the multielement photodetector 104 can have multiple benefits depending on the orientation of the photodetector elements and the design of the projected pattern. The first benefit is the measurement of additional degrees of freedom when the system is designed accordingly. This is a common practice in strain gauge rosette design. The simplest example would be a two-element photodetector (e.g., FIG. 4) with only quadrants I and II being photodetectors. Using the rectangular pattern shown in FIG. 4, and subtracting the output (voltage or current) of the right element from the left element, one degree of freedom, horizontal translation, can be measured as shown in 400. Adding a third photodetector element (as an example, quadrant IV in FIG. 4), then vertical translation can also be measured. One with average skill in the art of strain gauge rosette design will understand how additional elements can be added to measure additional degrees of freedom. The second benefit of adding additional elements is providing redundant measurements that can be combined to reduce the signal-to-noise ratio and thus improve the resolution of the measurement. If designed according to this second objective, redundant (or partially redundant) outputs for each degree-of-freedom being measured are combined to reduce noise. Again, FIG. 4 demonstrates how this might be done. Considering quadrants I and II, when the output of one is subtracted from the other, the same horizontal displacement information is provided as with quadrants IV and III, assuming no displacement other than horizontal. The two estimates (II minus I and III minus IV), however, will be slightly different due to noise in the system. It is well known in the art that averaging independent measurements increases the signal-to-noise ratio and thus the resolution of the measurement.

However, increasing the number of photodetectors in the multielement photodetector 104 may cause a reduction of size of each photodetector element and the need for additional analog circuitry. The reduction of size has a direct effect on the SNR which leads to a reduction in resolution of the displacement measurement as the noise as a percent of the signal is inversely proportional to the size of the element.

Figure 2C:
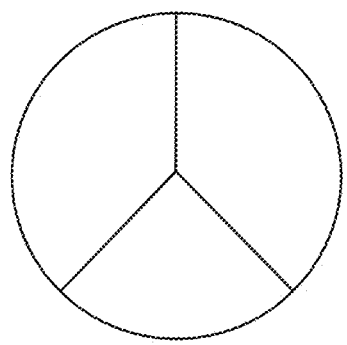
FIG. 2C illustrates examples of photodetector element geometry that may be utilized in a multielement photodetector that may be incorporated into embodiments of a sensor in accordance with an embodiment of the present disclosure.
Figure 2C:
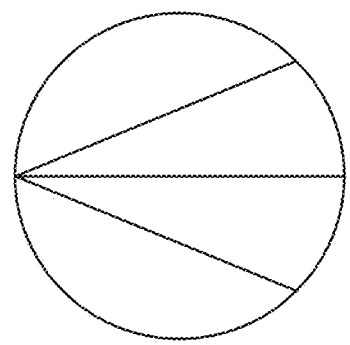
Figure 2C:
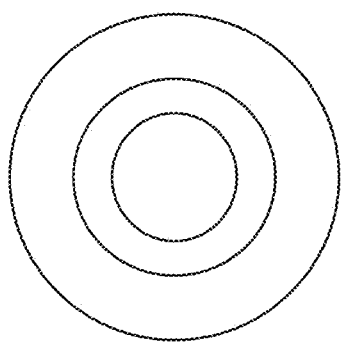
Figure 2C:
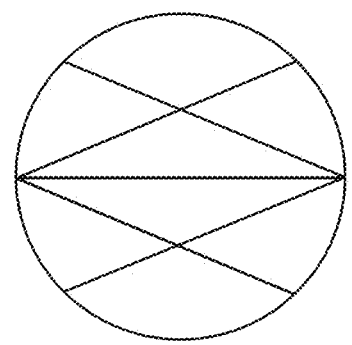
Figure 2C:
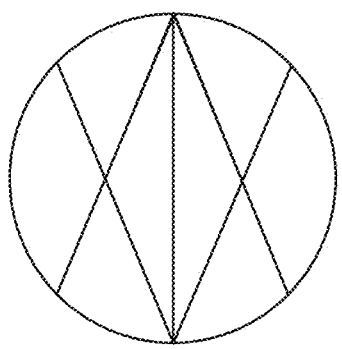
Figure 2C:
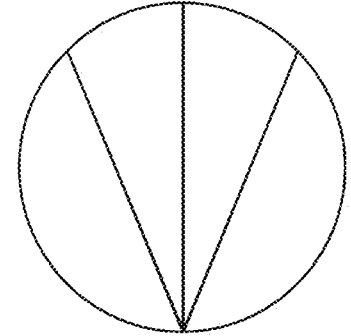
Figure 2C:
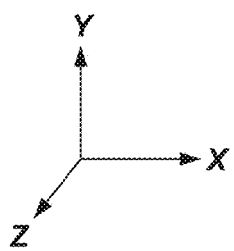

FIG. 2C illustrates examples of photodetector element geometry that may be utilized in a multielement photodetector 104 that may be incorporated into embodiments of the sensor 100.

Multielement photodetectors have a "small" number of photosensitive elements and, as a result, do not form an image in the same sense as camera chip-based systems. For example, a circular pattern, a square pattern, or a diamond pattern would all generate identical outputs from a quadrant photodetector. One of the consequences of this low resolution is that spot-centering applications do not require focusing the spot on the photodetector. A blurred or Gaussian cross-section spot and a sharply focused spot are equally as good for spot centering, particularly since the quadrant photodetectors are most precise when left minus right or top minus bottom is close to zero (e.g., the spot is centered).

Figure 2D:
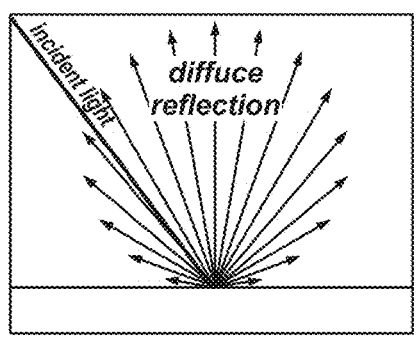
FIG. 2D illustrates how photons reflect off of a reflective surface.

A blurred or Gaussian cross-section is understood in the context of a focused image. FIG. 2D illustrates what happens when light (a bundle of photons) reflects off of a single point on an object. In this situation, the photons emanate in all directions. Each photon path can be thought of as a "ray of light."

Figure 2E:
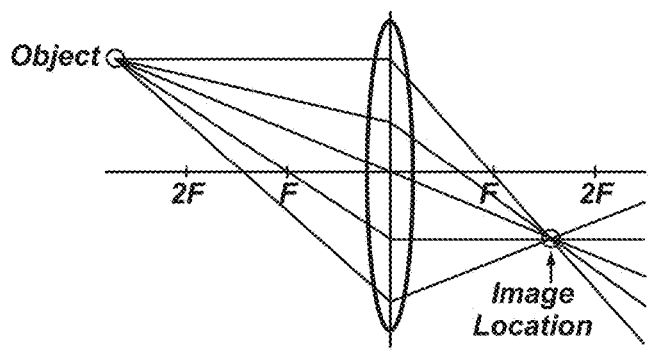
FIG. 2E illustrates how an example lens system operates on light rays.

FIG. 2E illustrates an example imaging system that gathers the light rays and redirects them to intersect on what is called the image plane. FIG. 2E is illustrated with a lens but could comprise a mirror or other imaging system type. FIG. 2E shows five light ray paths, but there are close to an infinite number, one for each photon that reflects off of the object and arrives at the imaging system.

Figure 2F:
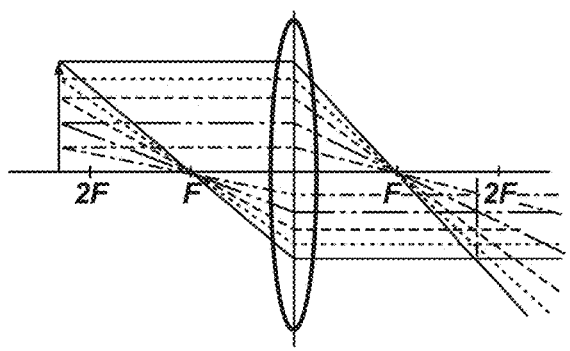
FIG. 2F illustrates how an example lens system operates on light rays.

The example imaging system redirects the light rays such that all the rays that come from the same point on the object arrive at or close to the same point on the image side of the lens in a plane, called the image plane. FIG. 2F shows multiple different points on the object and the corresponding points in the image plane.

The measure of an imaging system's ability to focus (produce a sharp image) can be measured by how well the light rays intersect at a single point on the image plane. They rarely all intersect at a single point but instead form a "smeared" spot. The size of the smearing of the spot (called the spot size) is a visual representation of how the light rays intersect and is used in optics to measure the quality of focus. For example, in FIG. 2H, the spot size increases as the distance from paraxial focal plan increases from 0 mm to 1 mm, and hence the quality of focus decreases. An image which is not focused does not have intersecting rays and there is no spot, just uniform illumination.

Figure 2G:
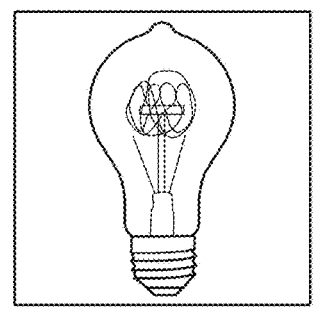
FIG. 2G is an illustration of an incandescent light.
Figure 2H:
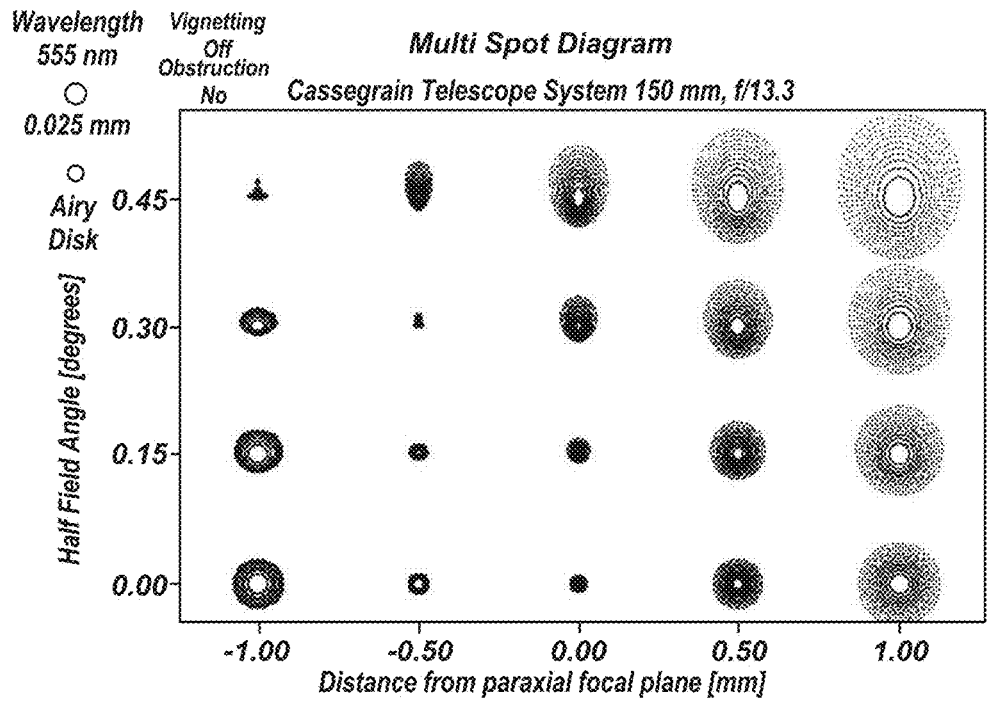
FIG. 2H illustrates how spot size varies with focal quality.

An old-fashioned unfrosted light bulb, FIG. 2G, is a good example of unfocused illumination: Even though the light is emitted by a filament that has a visual structure, you don't see that visual structure on the surfaces that the light emitted from the bulb illuminate, just evenly distributed illumination. That is because the light rays from the filament go in every direction evenly.

The number of elements in the photodetector and their shape and orientation can vary widely. In other words, the elements are not necessarily square but can be any shape that facilitates measurements in the direction desired (see FIG. 2C). For example, geometry 211 is optimized for rotation around the Z (coming out of the page) axis with only three elements. Geometry 213 is optimized for rotation around the X (horizontal) axis in one direction with only 4 elements. In another example, geometry 215 is optimized for rotation around the Y (vertical) axis in one direction with only 4 elements. Geometry 217 is optimized for translation along the Z axis. In an additional example, geometry 219 is optimized for rotation around the X axis in both directions. Geometry 221 is optimized for rotation around the Y axis in both directions. Although FIG. 2C depicts six example geometries, a nearly infinite number of alternatives are possible for one skilled in the art. In some embodiments, multiple configurations may be co-located on the same substrate.

In some instances, the geometry of the photodetector element may be dynamically reconfigurable. For example, a machine learning (ML) algorithm such as a Generative Adversarial Network (GAN) may be utilized to select a geometry that generates the highest current/voltage outputs per displacement unit along the desired axis or axes of displacement.

FIG. 3A illustrates an example of light pattern 323a incident on multielement photodetector 104. In this example, the multielement photodetector 304 is formed from a 9-element photodetector. The pattern light 123 (illustrated in cross-hatching) is just one of many patterns that may be used according to different embodiments of the invention.

FIG. 3B illustrates an example of light pattern 323b incident on multielement photodetector 104 after displacement along the X axis. The light pattern 323b as projected on to the multielement photodetector 104 after the displacement is illustrated with a dotted pattern.

Figure 3C:
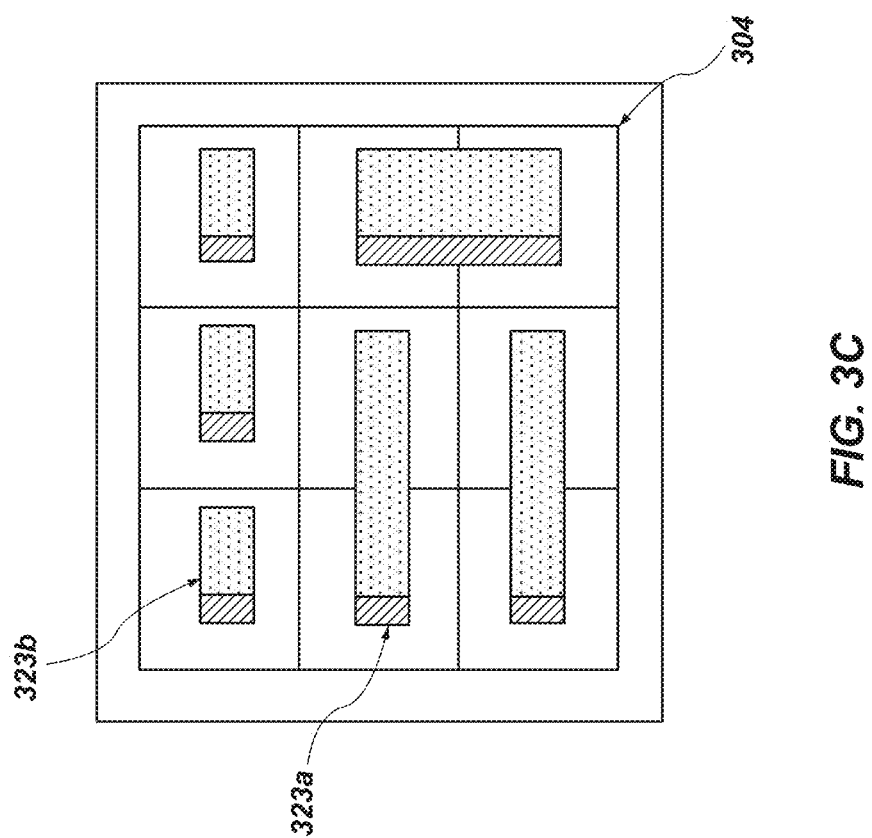
FIG. 3C illustrates an example of a light pattern incident on a multielement photodetector after the horizontal displacement overlaid onto the top of the light pattern incident on a multielement photodetector prior to the horizontal displacement.

FIG. 3C illustrates the position of light pattern 323b overlaid on the light pattern 323b to show the relative displacement of the patterns as a result of the displacement along the X axis. In some embodiments, the translation increases the left minus right voltage of the analog input signal 125 proportional to the translation.

Figure 4:
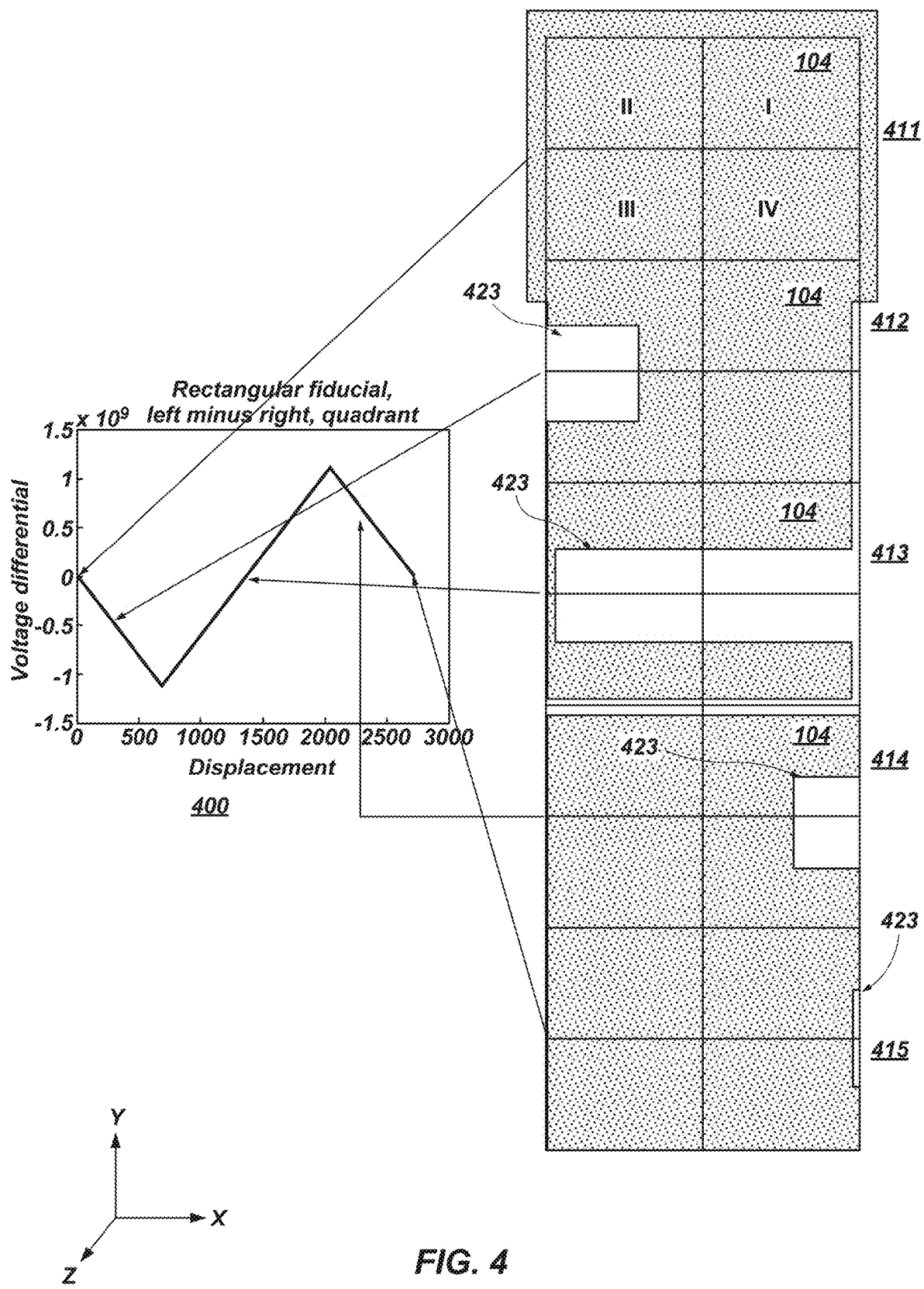
FIG. 4 illustrates an example voltage differential that is generated as a result of a light pattern passing over a multielement photodetector.

FIG. 4 illustrates an example voltage differential that is generated as a result of a light pattern 423 passing over multielement photodetector detector 404. In the example depicted in FIG. 4, the multielement photodetector 104 is a quadrant photodetector such as depicted in FIG. 2.

FIG. 4 further shows that as relative displacement occurs between the pattern projector 102 and the multielement photodetector 104, the light pattern moves between elements of the multielement photodetector. Specifically, starting with frame 411 and ending with frame 415, the light pattern 423 is displaced along the X axis with respect to the multielement photodetector 104. As the light pattern moves between elements of the multielement photodetector, the number of photons per unit time (photon flux) incident on each element in the photodetector changes. Each element of the photodetector generates an electrical current that is proportional to the number of photons it absorbs in a given period of time.

The graph 400 depicts the voltage differential that is measured by the analog electronics 106 as the light pattern 423 is displaced according to frames 411-415.

Figure 5:
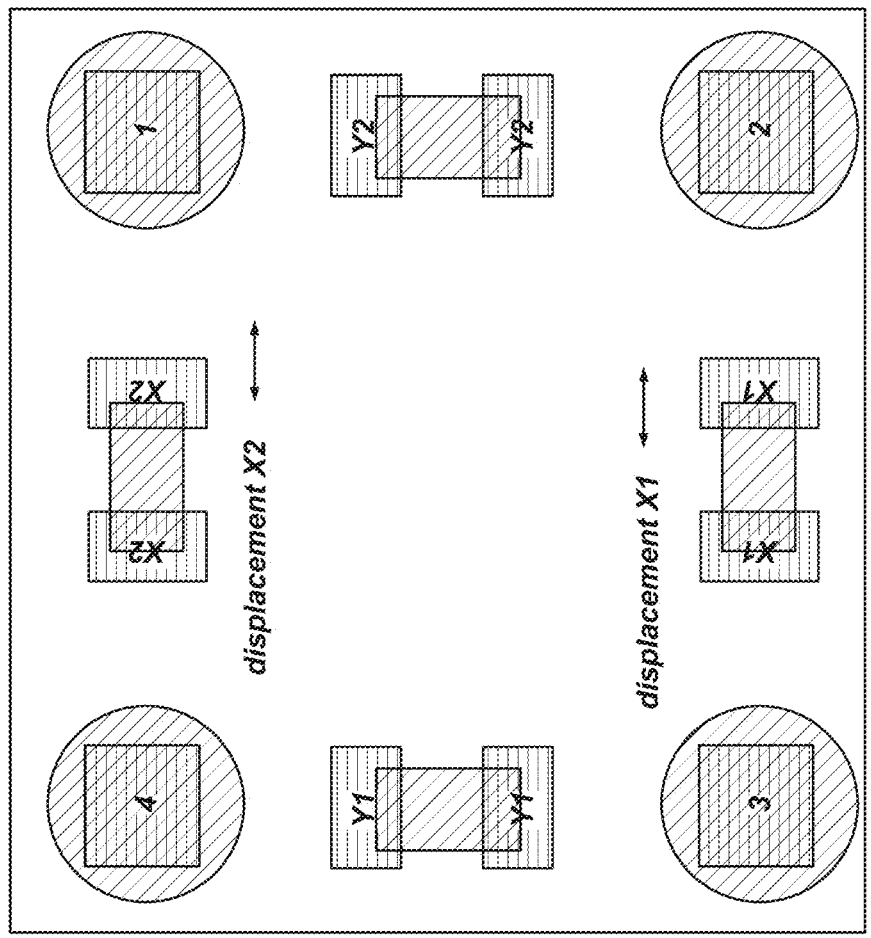
FIG. 5 illustrates an example array of multielement photodetectors and lights patterns that may be used to measure displacements along six Degrees of Freedom (DOF)
Figure 5:
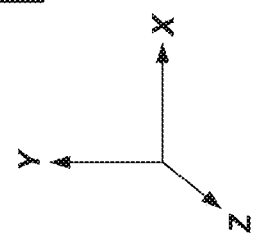
Figure 5:
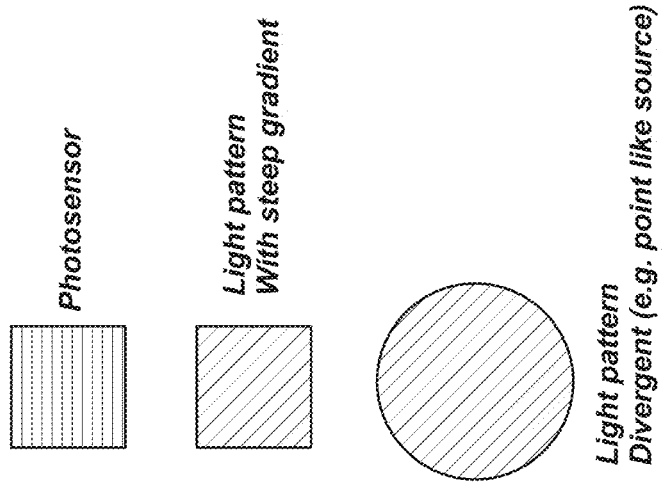

FIG. 5 illustrates an example of a sensor 100 that includes multiple configurations of patterned light 123 and multielement photodetectors 104 that can be co-located on the same substrate. Specifically, in the example illustrated in FIG. 5, multielement photodetectors 1, 2, 3, and 4 may be used to measure displacement along Z and rotations about X and Y axes. In addition, detector pairs X1, X2, Y1, and Y2 can be used to measure displacements along X and Y axes and rotation about the Z axis. As a result, the analog electronics 106 may calculate the translation along X as disp X1+disp X2 and the rotation about Z as (disp X1−disp X2)+(disp Y1−disp Y2).

Figure 6:
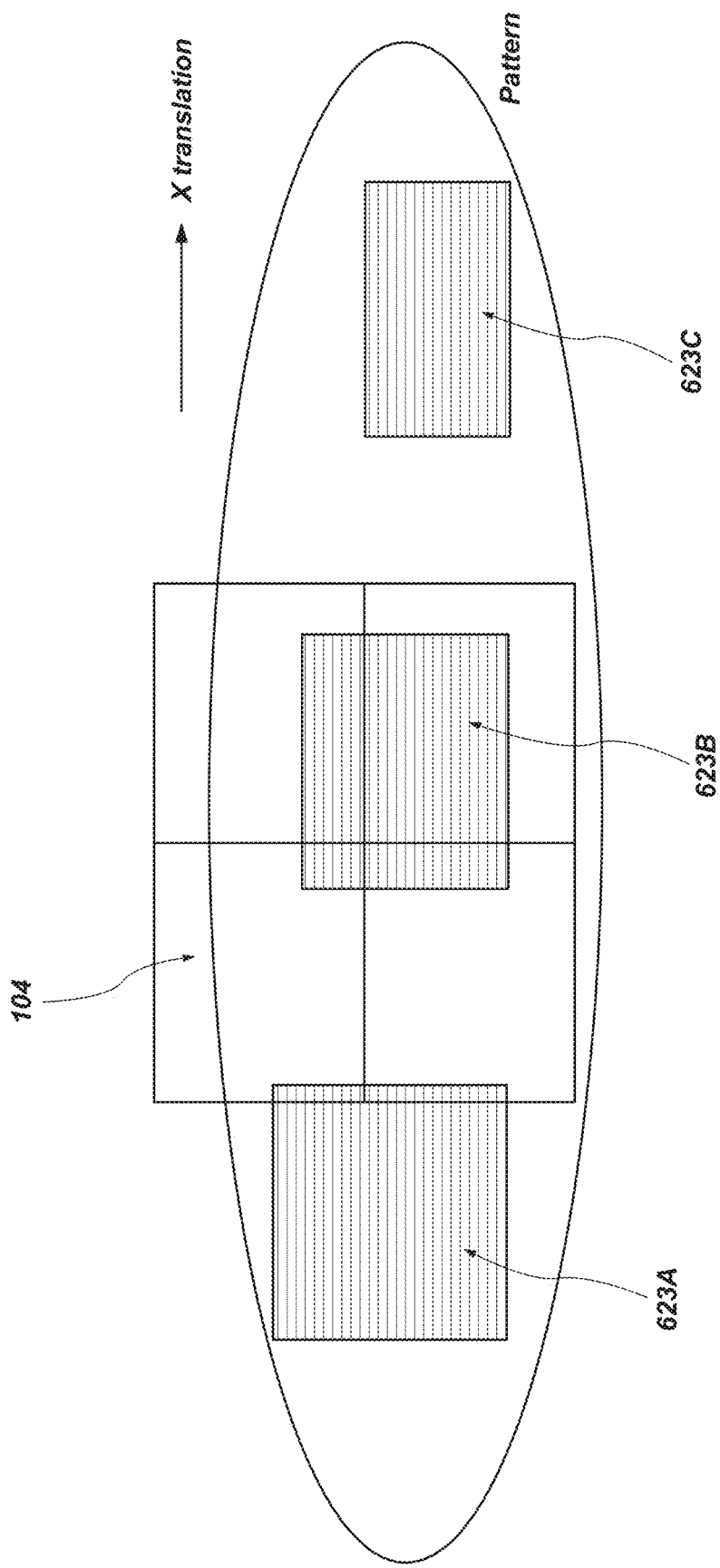
FIG. 6 illustrates an example light pattern that changes vertically as it exceeds the width of the photodetector horizontally.

FIG. 6 illustrates an example light pattern 623A/623B/623C that changes vertically as it exceeds the width of the multielement photodetectors 104 horizontally. In this example, as pattern translation exceeds the width of a respective photodetector, light pattern 623A/623B/623C changes in the vertical direction such that the vertical voltage difference (top minus bottom) acts as a course index into the horizontal position, whereas the left right difference acts as a fine position indicator.

Figure 7:
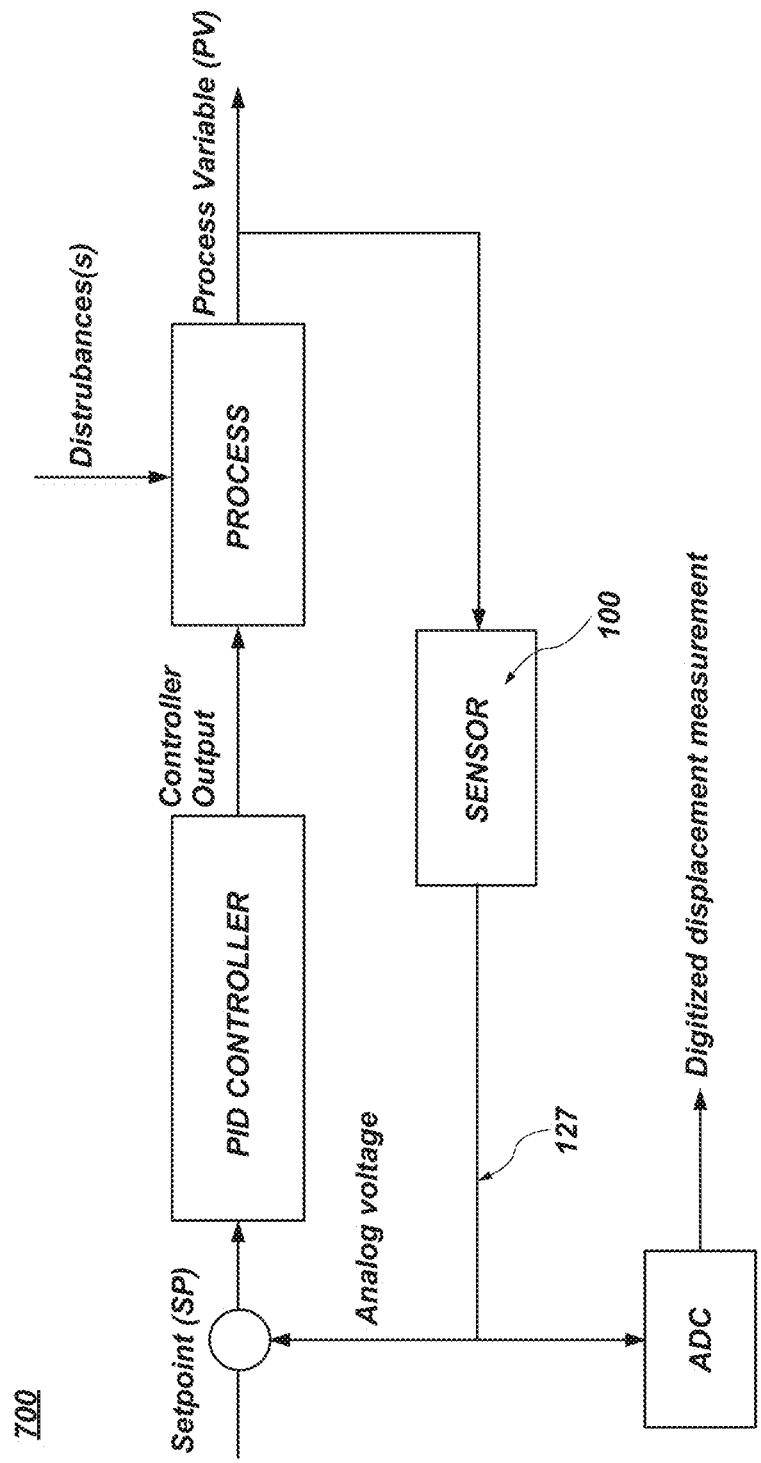
FIG. 7 is a schematic of a proportional-integral-derivative (PID) controller feedback loop that may be utilized with a sensor in accordance with an embodiment of the present disclosure.

A schematic of a proportional-integral derivative (PID) controller feedback loop 700 that may be utilized with the sensor 100 is depicted in FIG. 7 in accordance with an embodiment of the present disclosure. For example, as shown in the PID controller feedback loop 700, the one or more analog output signals 127 generated by the sensor 100 may be received by an analog to digital converter (ADC) and/or a PID controller for subsequent processing. For example, the ADC may convert the one or more analog output signals 127 to a digitized displacement measurement.

In addition, in some embodiments, the PID controller may use the one or more analog output signals 127 as a trigger for a set point.

In some instances, the one or more analog output signals 127 can be used to control an external system without ever having to be digitized. Utilizing the analog signals directly may eliminate latency (the delay between a change in the signal and an adjustment to the thing being controlled), increase the frequency of control updates, and/or reduce costs associated with the hardware that would be required if the signal were to be digitized.

Figure 8:
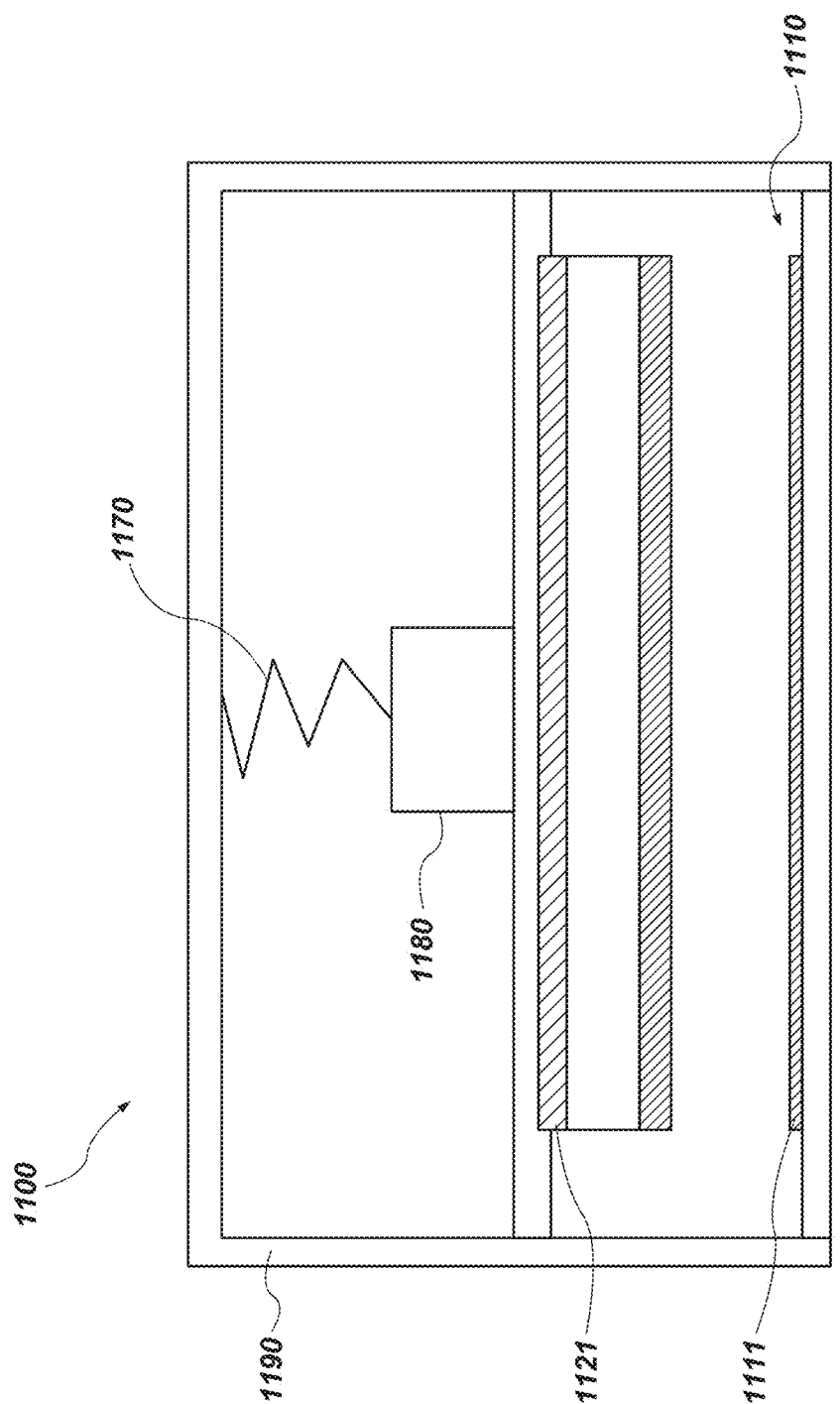
FIG. 8 illustrates a sensor application according to embodiments and teachings herein.
Figure 9:
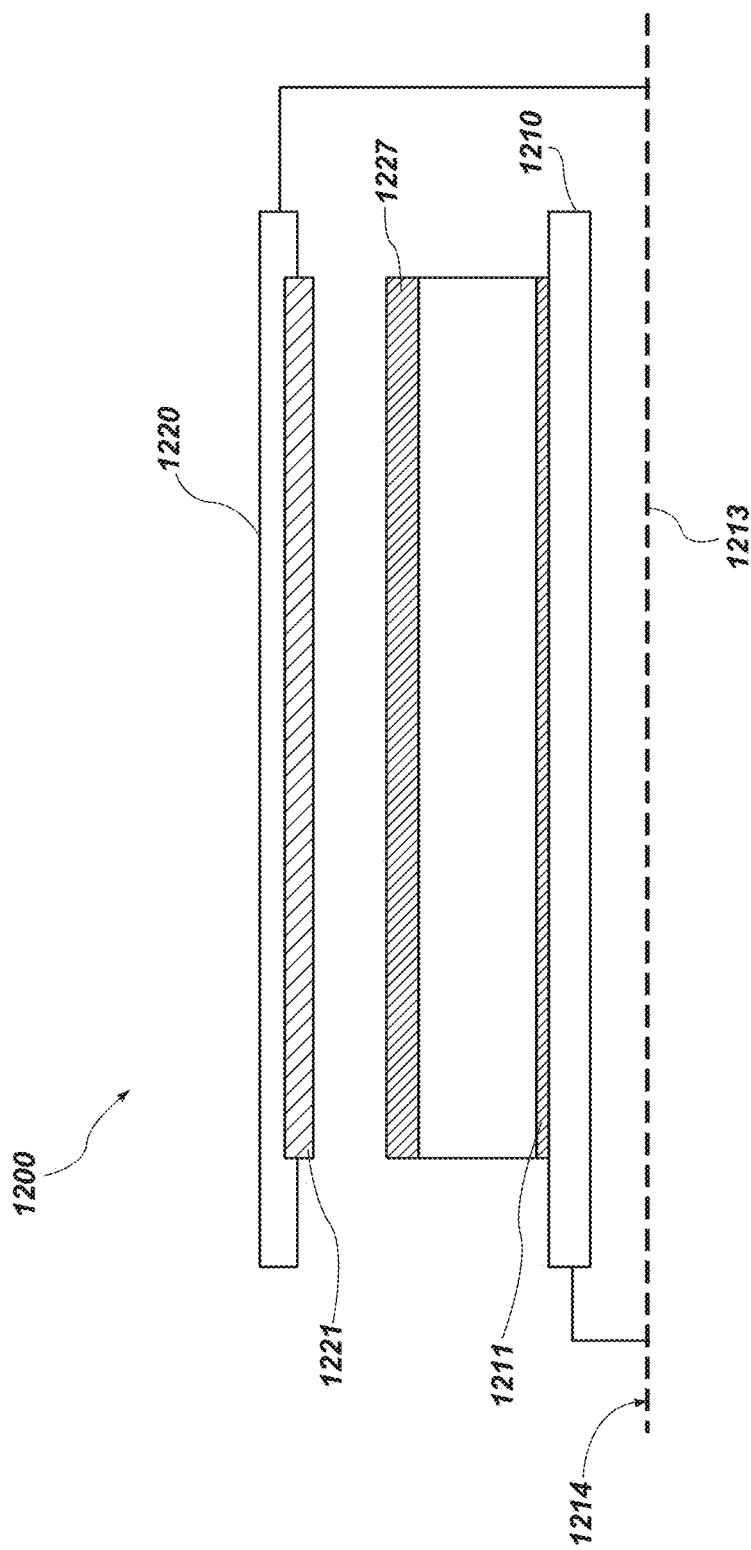
FIG. 9 illustrates a sensor application according to embodiments and teachings herein.

FIGS. 8 and 9 provide example embodiments of sensor 100 configured to measure acceleration, such as linear acceleration, and as an extensometer to measure strain, respectively. These examples are not meant to be limiting. For example, sensor 100 may be configured to measure a rate of rotation, such as measured by a gyroscope. Further, the sensor 100 may be configured to measure any one or more of strain, force, and torque.

FIGS. 10A-10D illustrate the relative translation and rotational motion of components of a sensor 1300 according to an alternative embodiment. Sensor 1300 includes all of the components described above with respect to FIG. 1 and is configured to measure any of a number of displacement-derived parameters, including acceleration and strain. FIGS. 10A-10D show first and second housings, 1320 and 1310 that can for example, house the components of sensor 100 shown in FIG. 1. For example, first housing 1320 can house the pattern projector 102 (an example of which is illustrated in FIG. 1). Second housing 1310 can house the multielement photodetector 104 (an example of which is illustrated in FIG. 1).

In addition to the sensor components shown in FIG. 1, sensor 1300 further includes a transparent elastic member 1301 disposed between first housing 1320 (housing the pattern projector 102) and second housing 1310 (housing the multielement photodetector 104). In one embodiment, elastic member 1370 comprises a silicone layer 1301 configured to hold the first housing 1320 and the second housing 1310 in a spaced apart arrangement, thereby holding pattern projector 102 and multielement photodetector 104 in a corresponding spaced apart arrangement.

In an example implementation, polymer layer 1301 comprises a polymer suspension, thereby providing a polymer suspension system for pattern projector 102 and first housing 1320. In one implementation, first housing 1320 includes one or more light sources (an example of which is illustrated in FIG. 1 at 122) and elastic layer 1301 is disposed outboard of the pattern projector 102.

Figure 10B:
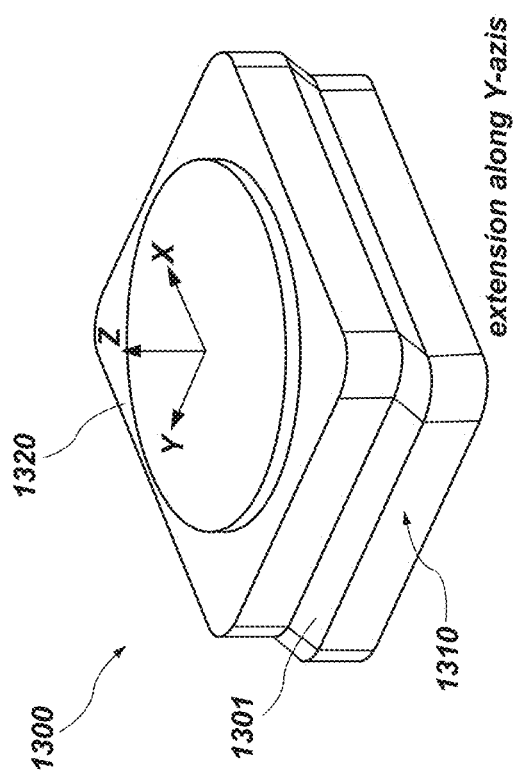
FIGS. 10A to 10D are perspective views of a sensor showing relative movement in several degrees of freedom of sensor components.
Figure 10D:
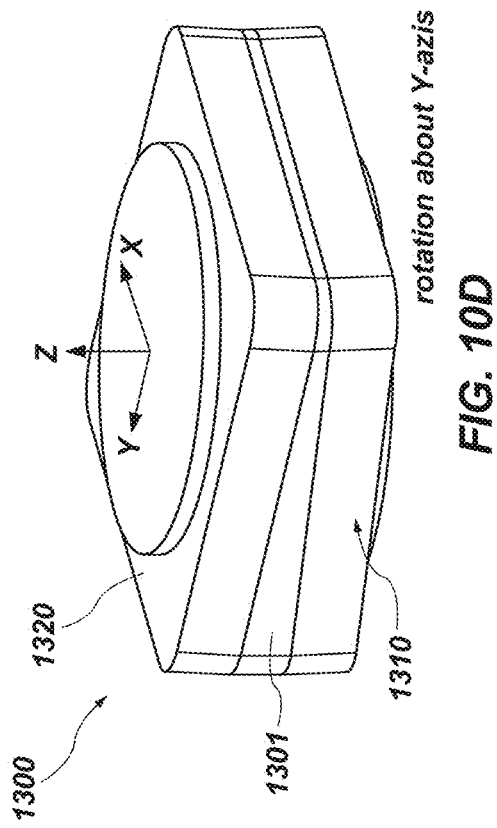
Figure 10A:
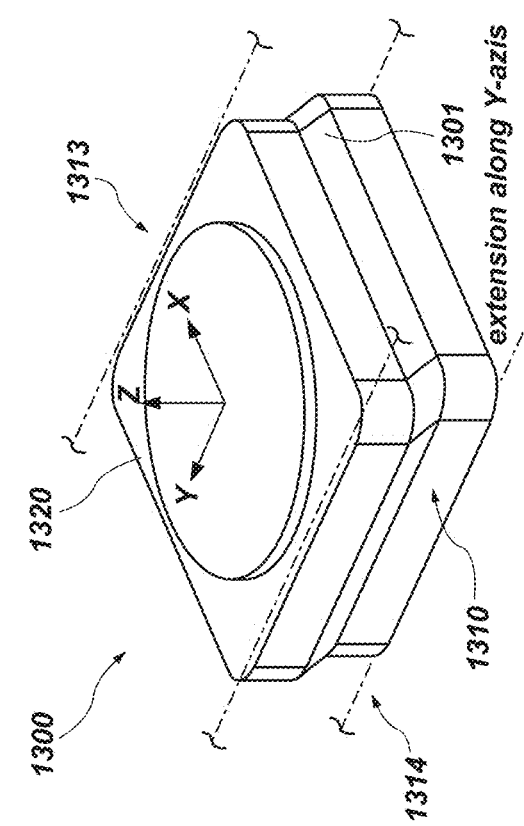
Figure 10C:
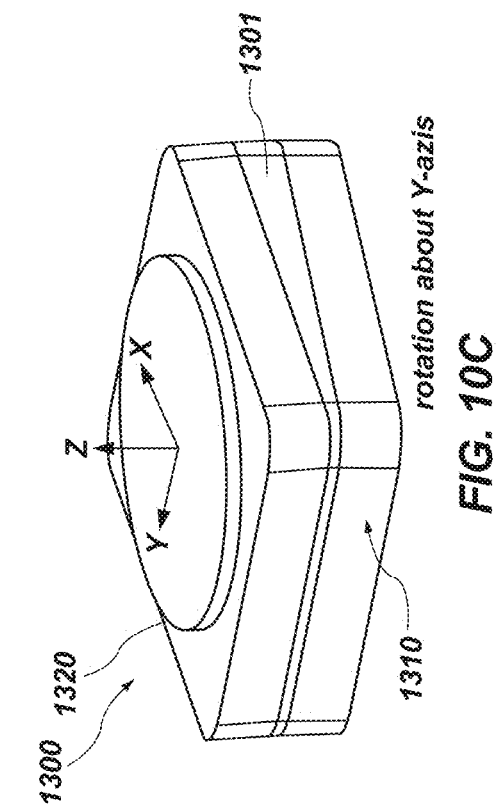

Polymer layer 1301 is compressible and expandable so as to facilitate relative movement of pattern projector 102 and first housing 1320 with several degrees of freedom of movement. For example, FIG. 10A shows the translation of first housing 1320 with respect to pattern projector 102 along a Y axis. FIG. 10B shows the translation of first housing 1320 with respect to pattern projector 102 along an X axis. FIG. 10C shows the rotation of first housing 1320 about a Y axis with respect to pattern projector 102. FIG. 10D shows rotation of first housing 1320 with respect to pattern projector 102 about the X axis. Variations within the scope of the disclosed embodiments include those in which pattern projector 102 rather than first housing 1320 translates or rotates as described above. Although not depicted, translation along the Z axis, rotation about the Z axis, or any combination of translation along or rotation about any of the three orthogonal axes is possible.

Transparent polymer layer 1301 can establish a nominal separation and orientation between first housing 1320 and second housing 1310, thereby establishing a corresponding nominal separation and orientation between pattern projector 102 and multielement photodetector 104. In some embodiments, the nominal separation and orientation define starting positions of pattern projector 102 and multielement photodetector 104, and displacement can be measured by reference to the nominal starting positions.

For example, first housing 1320 can be affixed to a first structure 1313, or a portion thereof, and second housing 1310 can be affixed to a second structure 1314, or a portion thereof. At the time of installation or affixing, multielement photodetector 104 can capture one or more reference or calibration images of pattern projector 102. During subsequent time periods, multielement photodetector 104 can capture a sequence of images of pattern projector 102. The images captured during the subsequent periods can be registered to the reference image (or images) that were captured earlier, thus producing an absolute displacement measurement from the time of installation, thereby providing a more accurate registration and facilitating a higher resolution displacement measurement.

In some applications, first housing 1320 rigidly holding pattern projector 102 therein, is affixed to a first structure 1313. Second housing 1310 rigidly holding multielement photodetector 104 therein, is affixed to a second structure 1314. Either the first structure, the second structure, or both structures can move with up to six degrees of freedom. The motion of either or both structures exerts corresponding forces upon the first and second housings in any of up to six degrees of freedom of motion. Either or both the first and second housings, and thus either or both of first housing 1320 and the second housing 1310, can move in response to these applied forces. As a result, corresponding forces will be exerted upon elastic layer 1301. Elastic layer 1301 is responsive to these forces in any one or more of six degrees of freedom of motion.

Figure 11:
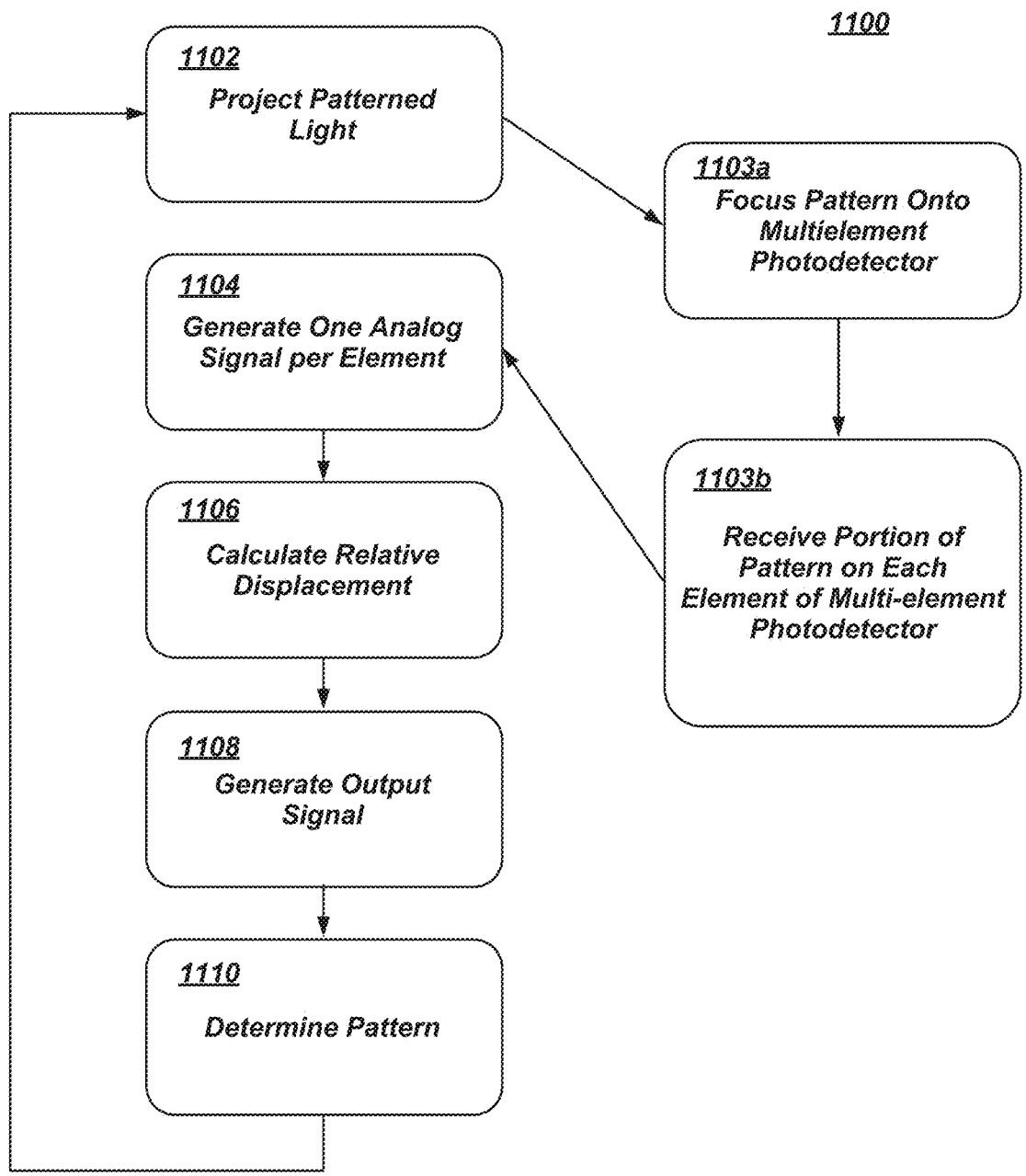
FIG. 11 is a flowchart illustrating a method for displacement measurement according to embodiments and teachings herein

FIG. 11 is a flowchart illustrating a method 1100 according to an embodiment disclosed herein. Specifically, method 1100 illustrates how embodiments of the present invention utilize a specific pattern and generate a signal based on the image of the specific pattern that is focused onto the photodetector surface. As a result of the focusing step 1103a, method 1100 is able to obtain a much higher resolution than a conventional system because in the conventional system the spot size only needs to be smaller than a quadrant to get the best possible image resolution.

At 1102 a patterned light is emitted by a pattern projector 1103a focused onto a multielement photodetector 1103b. In some instances, this step 1102 may be omitted. At 1104 each photodetector element that comprises the multielement photodetector generates an analog input signal that is proportional to the amount of the patterned light that is received by the respective photodetector.

In some instances, when the patterned light projector 1103a moves relative to the multielement photodetector 1103b, the photons are distributed differently between adjacent elements of the multielement photodetector. For the same displacement, the step of focusing the pattern creates a substantially larger (multiple orders of magnitude) change in the photon distribution between elements, which leads directly to a much larger change in the photodetector output than in previous methods that did not include the focusing step. This substantially larger change in output for the same displacement increases the SNR which is what results in the substantially improved measurement resolution.

At 1106 analog circuitry calculates a relative displacement of the multielement photodetector with respect to the pattern projector by comparing the analog input signal generated by each of the photodetector elements that comprise the multielement photodetector. The analog circuitry can be formed from analog components such as wires, resistors, capacitors, inductors, diodes, and/or operational amplifiers. In some instances, the analog components can be configured to form the analog circuitry in accordance with the example electrical schematic illustrated in 204 of FIG. 2A.

At 1108, the analog circuit generates an output signal that is proportional to the relative displacement calculated.

In optional step 1110, a new pattern to be projected in step 1102 is calculated based on the output signal. For example, the pattern may be changed with the displacement exceeding an upper or lower threshold.

It is to be understood that the embodiments of the disclosure are not limited to the particular structures, process steps, or materials disclosed herein, but are extended to equivalents thereof as would be recognized by those ordinarily skilled in the relevant arts. It should also be understood that the terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout this specification are not necessarily all referring to the same embodiment. A feature described with respect to an embodiment is not inextricably linked to that embodiment and the features described for that embodiment. Rather, a person of ordinary skill in the art recognizes features of an embodiment that are readily combinable with features from other embodiments.

As used herein, a plurality of items, structural elements, compositional elements, and/or materials may be presented in a common list for convenience. However, these lists should be construed as though each member of the list is individually identified as a separate and unique member. Thus, no individual member of such a list should be construed as a de facto equivalent of any other member of the same list solely based on their presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Furthermore, the described features, structures, or characteristics may be combined in any suitable manner in one or more embodiments. In the description, numerous specific details are provided, such as examples of lengths, widths, shapes, etc., to provide a thorough understanding of the embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

As would be apparent to one skilled in the relevant art, based on the description herein, embodiments of the present invention can be designed in software using a hardware description language (HDL) such as, for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

While the foregoing examples are illustrative of the principles of the present disclosure in one or more particular applications, it will be apparent to those of ordinary skill in the art that numerous modifications in form, usage, and details of implementation can be made without the exercise of inventive faculty, and without departing from the principles and concepts of the invention. Accordingly, it is not intended that the invention be limited, except as by the claims set forth below.

What is claimed is:

1. A sensor for measuring a relative displacement, the sensor comprising:
    a pattern projector that generates a patterned light and is mechanically coupled to a first structure;
    an image forming system that forms a focused image of the patterned light on a multielement photodetector;
    the multielement photodetector that is coupled to a second structure, wherein the multielement photodetector comprises a plurality of photodetectors that generate respective analog input signals that are proportional to an amount of light received from the focused image that is incident on a respective photodetector; and
    analog circuitry that outputs an analog signal that is proportional to the relative displacement of the first structure and the second structure by performing mathematical operations on the respective analog input signals of the plurality of photodetectors using analog circuit components.

2. The sensor of claim 1, wherein a pattern of the patterned light is selected based on the respective analog input signals of the plurality of photodetectors.

3. The sensor of claim 2, wherein the pattern is selected using a machine learning algorithm.

4. The sensor of claim 1, wherein the plurality of photodetectors includes four or more photodetectors.

5. The sensor of claim 1, wherein the relative displacement is measured with respect to six degrees of freedom.

6. The sensor of claim 1, wherein the pattern projector comprises organic LEDs (OLEDs).

7. The sensor of claim 1, wherein the plurality of photodetectors are arranged as concentric circles to form the multielement photodetector.

8. The sensor of claim 1, wherein the pattern projector and the multielement photodetector are mechanically coupled via a transparent elastic member.

9. A method for determining a relative displacement of a first structure and a second structure, the method comprising:
    generating, by a pattern projector, a patterned light, wherein the pattern projector is mechanically coupled to the first structure;
    forming, by an image forming system, a focused image of the patterned light on a multielement photodetector, wherein the multielement photodetector that is coupled to the second structure,
    generating, by a plurality of photodetectors that comprise the multielement photodetector, respective analog input signals that are proportional to an amount of light received from the focused image that is incident on a respective photodetector; and performing, by analog circuitry, mathematical operations on the respective analog input signals of the plurality of photodetectors to generate an analog signal that is proportional to the relative displacement of the first structure and the second structure.

10. The method of claim 9, wherein a pattern of the patterned light is selected based on the respective analog input signals of the plurality of photodetectors.

11. The method of claim 10, wherein the pattern is selected using a machine learning algorithm.

12. The method of claim 9, wherein the plurality of photodetectors includes four or more photodetectors.

13. The method of claim 9, wherein the relative displacement is measured with respect to six degrees of freedom.

14. The method of claim 9, wherein the pattern projector comprises organic LEDs (OLEDs).

15. The method of claim 9, wherein the plurality of photodetectors are arranged as concentric circles to form the multielement photodetector.

16. The method of claim 9, wherein the pattern projector and the multielement photodetector are mechanically coupled via a transparent elastic member.

17. An application specific integrated circuit (ASIC) for determining a relative displacement of a first structure and a second structure, wherein the ASIC is configured to execute a method comprising:

causing a pattern projector to generate a patterned light that is focused on a plurality of photodetectors that comprise a multielement photodetector, wherein the pattern projector is mechanically coupled to the first structure and the multielement photodetector that is coupled to the second structure;

performing, by analog circuitry, mathematical operations on respective analog input signals of the plurality of photodetectors, wherein the respective analog input signals are proportional to an amount of light received from the patterned light that is incident on a respective photodetector; and generating an analog signal that is proportional to the relative displacement of the first structure and the second structure based on the mathematical operations.

18. The ASIC of claim 17, wherein a pattern of the patterned light is selected based on the respective analog input signals of the plurality of photodetectors.

19. The ASIC of claim 17, wherein the relative displacement is measured with respect to six degrees of freedom.

20. The ASIC of claim 17, wherein the plurality of photodetectors are arranged as concentric circles to form the multielement photodetector.

* * * * *